United States Patent
Cornic (10) Patent No.: US 6,382,378 B1
(45) Date of Patent: May 7, 2002

(54) STATIC SYSTEM FOR SUPPLYING CURRENT THROUGH THE GROUND FOR AN ELECTRIC VEHICLE AND ELECTRIC VEHICLE INTENDED TO BE SUPPLIED BY MEANS OF SUCH A SUPPLY SYSTEM

(75) Inventor: Daniel Cornic, Fourqueux (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/694,356

(22) Filed: Oct. 24, 2000

(30) Foreign Application Priority Data

Oct. 25, 1999 (FR) .............................................. 99 13289

(51) Int. Cl.$^7$ .............................................. B60M 1/10
(52) U.S. Cl. .................................. 191/6; 191/2; 191/14; 191/17; 191/20
(58) Field of Search ............................ 191/2, 6, 14, 17, 191/20; 307/116, 145, 9.1; 318/135

(56) References Cited

U.S. PATENT DOCUMENTS

| | | | |
|---|---|---|---|
| 3,649,877 A | * 3/1972 | Friedman et al. | 317/148.5 R |
| 3,938,032 A | * 2/1976 | Demarest | 323/24 |
| 4,172,980 A | * 10/1979 | Hsieh et al. | 307/9 |
| 4,301,899 A | * 11/1981 | McSparran et al. | 191/3 |
| 4,476,947 A | * 10/1984 | Rynbrandt | 180/2.1 |
| 4,543,518 A | * 9/1985 | Guilloux | 318/757 |
| 5,118,963 A | * 6/1992 | Gesin | 307/116 |
| 5,134,254 A | * 7/1992 | Musachio | 191/6 |
| 5,208,495 A | * 5/1993 | DePalma et al. | 307/640 |
| 5,424,584 A | * 6/1995 | Matsuda et al. | 307/10.1 |
| 5,614,788 A | * 3/1997 | Mullins et al. | 315/82 |
| 5,810,136 A | * 9/1998 | Siciliano et al. | 191/18 |

FOREIGN PATENT DOCUMENTS

| | | |
|---|---|---|
| EP | 0962353 A1 * | 8/1999 |
| EP | 0 962 353 A1 | 12/1999 |
| FR | 2 762 810 A1 | 11/1986 |
| FR | 2 696 985 A1 | 4/1994 |
| WO | WO 91/01232 | 2/1991 |

* cited by examiner

Primary Examiner—S. Joseph Morano
Assistant Examiner—Frantz F. Jules
(74) Attorney, Agent, or Firm—Sughrue Mion, PLLC (57) ABSTRACT

A system for supplying current through the ground for an electric vehicle, especially for an electric rail vehicle, includes a succession of conducting segments (16A, 16B, 16C, 16D) which are electrically isolated from each other and together form a conducting supply track against which at least one supply collector shoe (32) on the vehicle is applied, and a set of high-voltage supply devices (20) each connected to a conducting segment and each provided with a detector capable of detecting a collector shoe and with switching devices (45) suitable for selectively causing a corresponding segment to be supplied with current when a collector shoe is present on the segment and causing the said collector shoe to be connected to a zero-potential source (26) when a collector shoe is not present thereon. The switching devices include a pair of elements (T1, T2) forming static switches controlled by detector (44) in order to cause the corresponding segment to be supplied with current when a collector shoe is present thereon and to be connected to the zero-potential source when a collector shoe is not present thereon, respectively. Each supply device furthermore includes short-circuiting devices (52, 54) which are forced into the closed state, and are interposed between the corresponding segment and the zero-potential source (26), and which are made to open by the detector (44).

28 Claims, 2 Drawing Sheets

FIG.3

STATIC SYSTEM FOR SUPPLYING CURRENT THROUGH THE GROUND FOR AN ELECTRIC VEHICLE AND ELECTRIC VEHICLE INTENDED TO BE SUPPLIED BY MEANS OF SUCH A SUPPLY SYSTEM

BACKGROUND OF THE INVENTION

1. Field of the Invention

The present invention relates to a system for supplying current through the ground for an electric vehicle, particularly for an electric rail vehicle.

It also relates to an electric vehicle supplied by means of such a system.

2. History of the Related Art

The expression "system for supplying current through the ground" should be understood to mean a supply system by means of which the electrical energy needed to supply the motor of the vehicle is delivered via a segmented conducting track with which the roadway on which the vehicle runs is equipped, the energized segments of which conducting track are at any moment covered by the outline of the vehicle, as opposed to supply systems using a network of overhead lines against which a current pick-up pantograph is applied.

Supply systems using overhead lines have a number of unacceptable drawbacks, especially drawbacks relating to aesthetic appearance, which make them unsuitable for supplying a vehicle intended to run through protected historical areas, for example classified urban centres.

Systems for supplying current through the ground, in which the supply devices for the conducting tracks are incorporated into the roadway, overcome this drawback.

At the present time, there are several types of systems for supplying current through the ground.

One example of a known system is described in document EP-A-0,761,493. This system comprises a conducting track consisting of a succession of plates, electrically insolated from each other, which cover a duct within which an elastically deformable ribbon containing a ferromagnetic material extends, the two faces of which ribbon are covered with a conductive material.

The upper face of the ribbon is connected to a supply line.

According to this technique, the rail vehicle is equipped with magnets suitable for magnetically attracting the ribbon so that the latter comes into contact via its upper face with one of the plates of the conducting track against which a supply collector shoe on the vehicle moves.

This type of supply system, although aesthetically more attractive, has a not insignificant response time and requires the provision of a moving element, namely the elastically deformable ribbon, which is liable to cause a not insignificant number of malfunctions.

SUMMARY OF THE INVENTION

The object of the invention is to remedy. these drawbacks and to provide a system for supplying current through the ground having great operating simplicity, having a minimal response time and making it possible to achieve greater safety, reliability and availability.

The subject of the invention is therefore a system for supplying current through the ground for an electric vehicle, especially for a rail vehicle, comprising a succession of conducting segments which are electrically isolated from each other and together form a conducting supply track against which at least one supply collector shoe on the vehicle is applied, this or these collector shoes coming successively into contact with the segments during the movement of the vehicle, and a set of high-voltage supply devices each connected to a conducting segment and each provided with means for detecting a collector shoe and with switching means suitable for selectively causing a corresponding segment to be supplied with current when a collector shoe is present on the latter and causing the said segment to be connected to a zero-potential source when a collector shoe is not present thereon, characterized in that the switching means include a pair of elements forming static switches controlled by the detection means in order to cause the corresponding segment to be supplied with current when a collector shoe is present thereon and to be connected to the zero-potential source when a collector shoe is not present thereon respectively, and in that each supply device furthermore includes short-circuiting means which are forced into the closed state, and are interposed between the corresponding segment and the zero-potential source, and which are made to open by the detection means.

This system for supplying current through the ground may furthermore include one or more of the following characteristics, taken in isolation or in any technically possible combination:

- the means for detecting when a collector shoe is present on the corresponding segment include means for detecting a coded signal transmitted, by conduction and by carrier current, by the vehicle to the said device via the collector shoe;
- since the coded signal carries coded information relating to the vehicle which has transmitted it, the detection means include means for processing the said information and means for comparing data resulting from the said processing with data corresponding to information relating to the vehicle permitted to run on the conducting track;
- the detection means include means for checking that the coded signal has been received in its entirety, by processing a redundant cyclic code incorporated into the said signal;
- it furthermore includes a device for monitoring the voltage on each segment connected to each of the said detection means, the said monitoring devices comprising means for comparing the voltage on the corresponding segment with a maximum threshold value, and a set of logic circuits designed to cause the short-circuiting means to close should the threshold value be exceeded and a collector shoe not be present;
- the monitoring device constitutes an element independent of the processing means;
- each supply device is provided with a fuse placed in series on the switch-forming element that controls the supply of current to the corresponding segment;
- the detection means are connected to the devices for supplying current to a predetermined number of immediately adjacent segments in order to position the switching means of these devices so as to supply the respective segments with current when the said detection means operate the switching means in such a way as to cause the segment that corresponds to them to be supplied with current;
- the detection means include a microprocessor connected to an amplifier and to a passband filter, the output of which controls the power and/or control switching of the switch-forming elements;
- the elements forming static switches consist of insulated-gate bipolar transistors (IGBTs);

each supply device includes means for monitoring the voltage across the terminals of the IGBT transistors for the purpose of preventing the corresponding segment from being supplied with current in the presence of a malfunction, especially in the presence of a current flowing through the transistors having a value greater than a permissible maximum value;

the supply devices are each disposed in a removable module placed in a duct which is made in a roadway along which the vehicle runs and is covered in a sealed manner by the conducting segments, a highvoltage supply line and a line set at a zero potential providing a supply return being disposed longitudinally in the duct;

the duct is disposed approximately in the central part of the area of the roadway along which the vehicle runs;

the means for supplying current to the switching means and to the detection means comprise the high-voltage supply line;

when the vehicle has a second collector shoe providing a return for the supply current, the detection means include means for discriminating between the polarity of the supply and current-return collector shoes;

the outputs of the supply devices constitute a means for locating the vehicle, intended to locally operate signalling devices, and/or a means for detecting malfunctions for the purpose of carrying out a diagnostic check.

The subject of the invention is also an electric vehicle intended to be supplied by means of a system for supplying current through the ground, as defined above, characterized in that it includes at least one collector shoe for supplying current to the motor of the vehicle, which collector shoe is intended to be applied against the conducting track of the system for supplying current through the ground and to which collector shoe are connected means for transmitting a coded signal conveying information relating to the type of vehicle to which the electric vehicle belongs.

Preferably, when the vehicle consists of an electric vehicle guided by a guide rail, the return of the supply current is provided by rails along which the rail vehicle runs or by the guide rail.

As a variant, the vehicle includes at least one second collector shoe providing the return of the supply current, this second collector shoe being longitudinally offset with respect to the shoe for supplying current to a predetermined number of segments.

BRIEF DESCRIPTION OF THE DRAWINGS

Other characteristics and advantages will emerge from the following description, given solely by way of example and with reference to the appended drawings in which.

DETAILED DESCRIPTION OF THE PREFERRED EMBODIMENTS

Figures 1, 2:
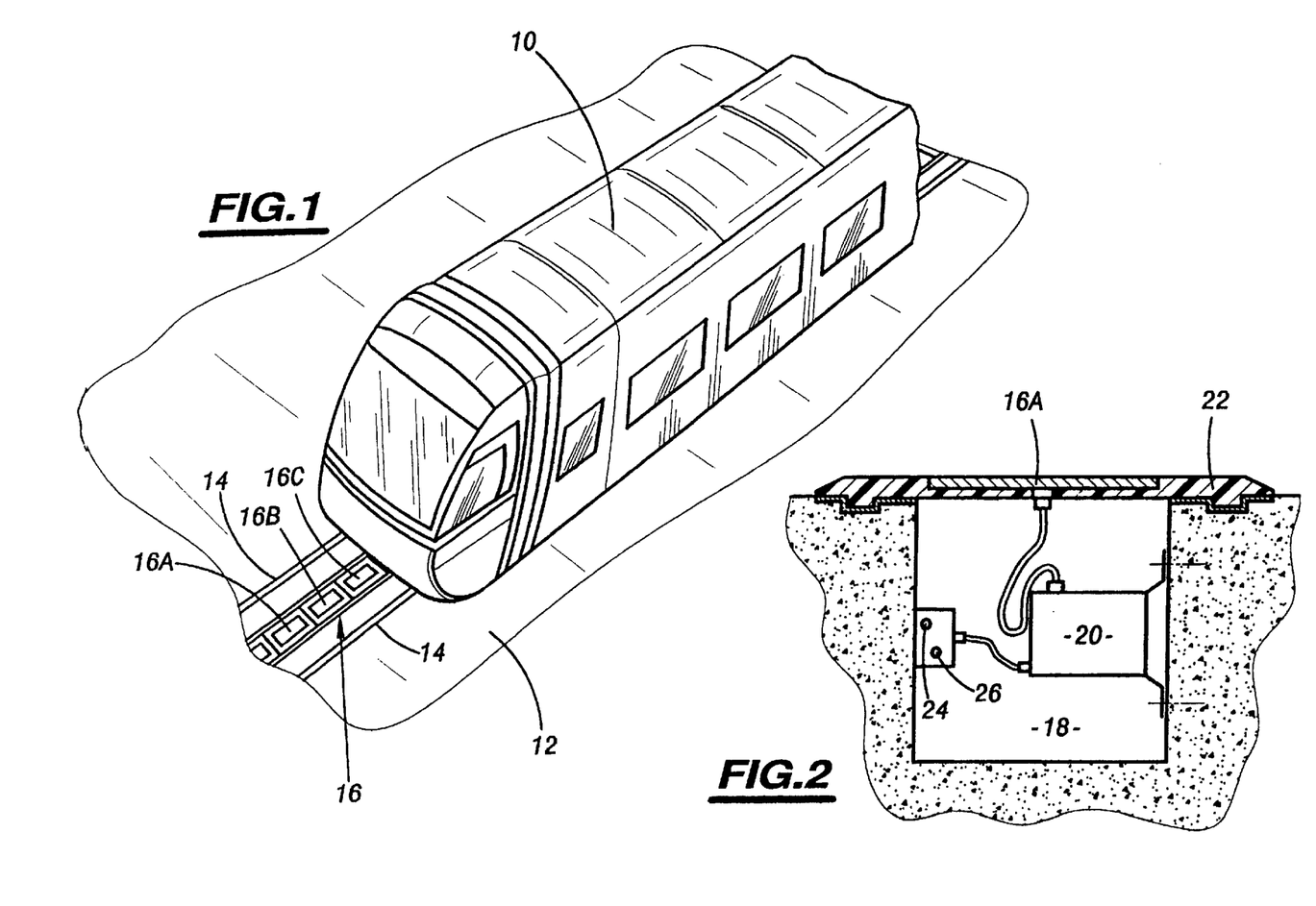
FIG. 1 shows a schematic view illustrating an example of how a system for supplying current through the ground according to the invention is installed.
FIG. 2 shows a cross-sectional view of a roadway provided with a duct equipped with a system for supplying current through the ground according to the invention.

FIG. 1 shows an example of how a system for supplying current to an electric vehicle 10 through the ground is installed.

In the embodiment shown, the vehicle 10 consists of a public transport vehicle, particularly a tramway.

However, it should be understood that the invention also applies to any type of electric vehicle, for example private cars, electric buses or rail vehicles.

In the embodiment shown, the vehicle 10 runs along a roadway 12 provided with running rails 14 which guide the vehicle.

These rails may be omitted if the vehicle 10 is provided with guiding wheels advantageously fitted with tires.

A high-voltage supply track 16, for example at 750 V, intended for supplying electrical energy to the motor of the vehicle 10, extends longitudinally along the roadway 12 so as to be central with respect to the rail 14, that is to say along the longitudinal mid-axis of the vehicle 10.

The supply track is intended to cooperate with one or more supply shoes or supply collector shoes with which the vehicle 10 is equipped.

As may be seen in FIG. 1, the supply track 16 consists of a succession of conducting segments, such as 16A, 16B and 16C, against which the supply collector shoe on the vehicle is applied during the movement of the latter.

Each segment has a length which is dependent on the length of the vehicle to be supplied. Their width is chosen so as to be able to ensure contact over the entire width with the collector shoe, taking into account possible lateral movements of the latter, without any guiding constraint.

The segments are isolated from each other by a suitable insulating material.

As may be seen in FIG. 2, the successive segments forming the supply track 16 are disposed so as to cover a duct 18 in which are disposed a set of high-voltage supply devices, such as 20, each supply device 20 being electrically connected to a conducting segment.

In order to impart sufficient mechanical strength to allow the traffic loads to be withstood, each segment 16 is mounted on a frame 22 made of insulating material which is itself fastened, in a sealed manner, to the edge of the duct 18.

Preferably, the supply device 20 and, where appropriate, the segment 16 and the frame 22 which correspond to it, form a removable and interchangeable modular assembly so as to make it easy to carry out maintenance and to replace worn or defective elements.

In particular, the supply devices 20 are each disposed in a removable and sealed module.

The entire set-up withstands temporary immersion of the tracks.

As may be seen in FIG. 2, a supply line 24 of the high-voltage device 20 and a line 26, set at a zero potential and providing a return for the supply current, travel along the duct 18 and are connected to the set of supply devices 20.

Each supply device 20 incorporates switching means which selectively supply current to a conducting segment 16A, 16B and 16C as soon as a contact is made between the supply shoe on the vehicle and the latter and set this segment at a zero potential when there is no such contact.

Preferably, the switching means also supply the two immediately adjacent segments with current, this supply being cut off when this adjacent actuation does not occur.

Thus, when the vehicle 10 is running along the conducting track 16 it is supplied by the supply device 20 associated with the segment 16A, 16B and 16C with which it is in contact, the other segments outside the adjacent segments remaining unpowered, that is to say set at a zero potential.

It will be noted that the supply shoe or shoes with which the vehicle is equipped are placed longitudinally in such a way that a predetermined number of unpowered segments separate the powered segment from the end of the vehicle 10.

This characteristic, combined with the supply track 16 being centrally positioned and the voltage on each segment being permanently controlled, avoids any risk of electrocution which might arise in the event of a user, for example a pedestrian or a motor vehicle, coming into contact with a powered segment, thereby preventing such a segment being exposed or isolated.

As will be mentioned below, the switching rate of the supply devices is chosen so that the segments become unpowered again before the end of the vehicle's passage.

Figure 3:
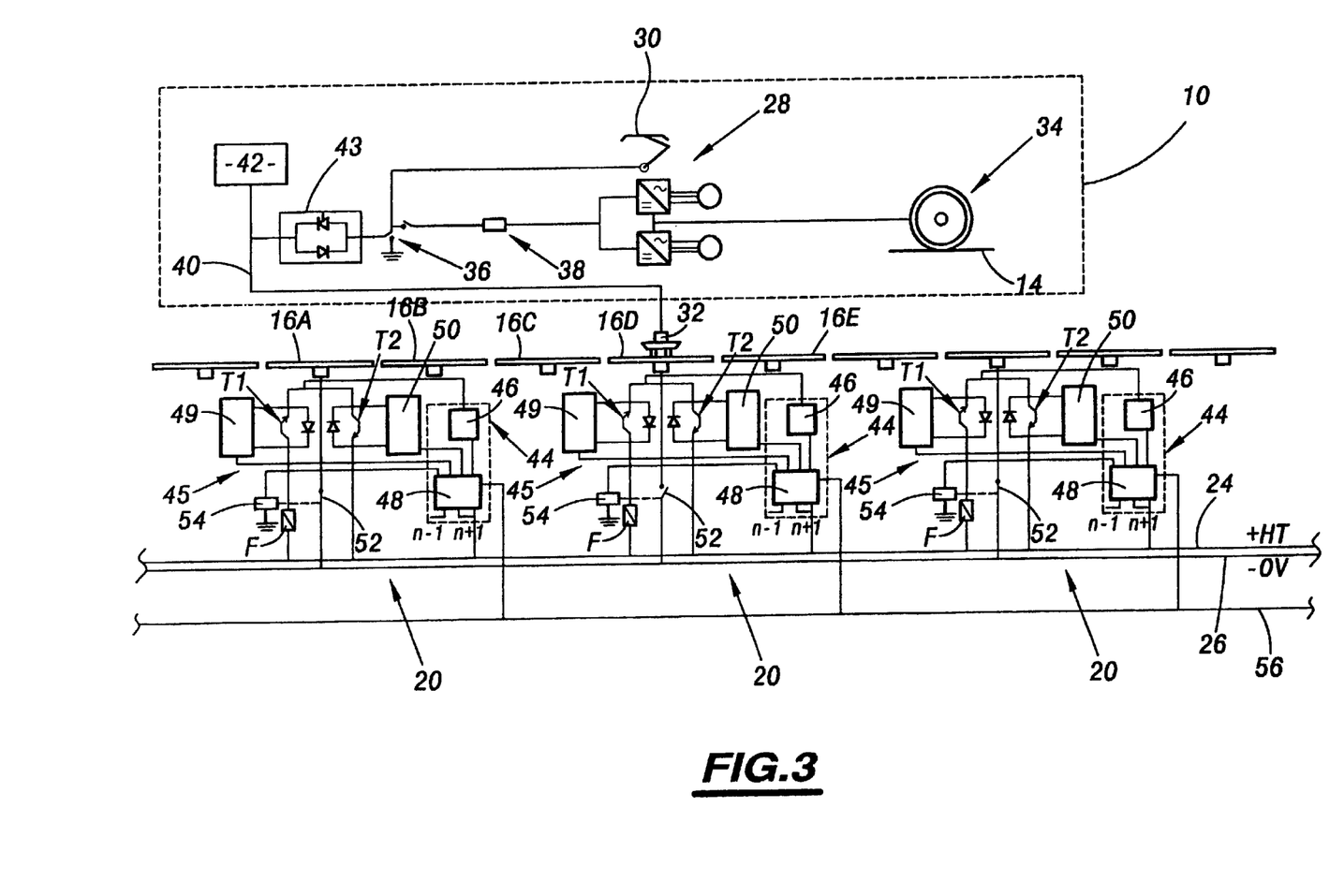
FIG. 3 is a block diagram of the supply system according to the invention and of an electric vehicle supplied by such a system.

The detailed description of the device 20 for supplying the segments with current will now be presented with reference to FIG. 3.

In this figure, only part of the vehicle 10 has been shown. The embodiment in question corresponds to a vehicle having a hybrid supply, that is to say it is designed to be supplied with current either via an overhead line or through the ground.

Moreover, in the embodiment shown, the vehicle is provided with wheels guided by a rail, the return of the supply current taking place via the rails.

Should the vehicle be provided with wheels fitted with tires, with no guide rail, the current return would take place by providing a specific negative shoe which would come into contact with a segment connected to the current return of the track 16. In this case, the two shoes are separated by a predetermined number of segments.

As may be seen in this FIG. 3, the traction system 28 of the vehicle 10 is connected, on the one hand, either to a pantograph 30 for its supply by means of a network of overhead lines or to a supply shoe 32 for its supply by means of the system for supplying current through the ground and, on the other hand, to the vehicle's wheels 34 in order to provide the return of the supply current.

In order to select the supply mode, a switch 36 in series with a filter circuit 38 selectively brings the traction system 28 into communication either with the pantograph 30 or with the shoe 32.

This switching operation may be carried out either manually by the driver of the vehicle, or automatically.

In the latter case, the entries into an area allowing supply through the ground are equipped with beacons which communicate with suitable detectors mounted on board the vehicle in order to operate the lowering of the collector shoes 32 and the switch 36.

In the rest of the description, it will be assumed that the switch 36 is positioned so as to cause the traction system 28 to be supplied by means of the shoe 32.

As may be seen in FIG. 3, the power cable 40 connecting the traction system 28 and the shoe 32 is connected to a transmitter circuit 42 which transmits a coded signal conveying, by carrier current, information relating to the type of vehicle to which the vehicle 10 belongs, this coded signal being transmitted by conduction to each supply device 20 by means of the shoe 32 with which it communicates.

For example, the coded signal is transmitted at a frequency of between 180 and 220 kHz.

In addition, a diode/thyristor combination 43 allows energy recovery on the line.

FIG. 3 shows that the segments 16A, 16B and 16C visible in FIG. 1 are not in contact with the shoe 32, only the segment 16D being in contact with the shoe 32. Thus, only the segment 16D conducts the. traction current, the segments 16C and 16E being pre-energized by the adjacent actuations, and the other segments being connected to the zero potential.

For the sake of clarity, only three supply devices 20 have been shown. However, it should be understood that each segment is provided with such a device.

The construction of each of these supply devices 20 will now be described below.

Each conducting segment is connected, on the one hand, to a stage 44 for detecting the presence of a shoe and for analyzing the signals received from the transmitter 42 and, on the other hand, to a switching stage 45 which causes the segment to be supplied with current when the presence of a shoe on this segment is detected, this segment being normally connected to the line 26 set at a zero potential.

The detection and analysis stage 44 includes a module 46 for receiving the carrier currents received from the transmitter 42.

This module 46 is produced by means of conventional techniques suitable for filtering, demodulating and extracting the data transmitted by the transmitter. It will therefore not be described in detail below. However, it should be noted that it delivers the extracted data to a microcontroller 48 which carries out the actual detection of the shoe and the analysis of the data extracted from the signals coming from the transmitter 42.

In particular, the microcontroller 48 carries out this detection and this analysis by means of a coding of the cyclic recognition type (CRC), that is to say it processes the data delivered by the receiving module 46 for the purpose of calculating a specific code and compares the code thus calculated with a predetermined code which is stored in memory and corresponds to the type of vehicle permitted to run on the conducting track 16.

In this way, a vehicle incompatible with the voltage level provided by the supply devices is prevented from being supplied.

After this processing, that is to say on the one hand after detecting the signal transmitted by the transmitter 42, corresponding to the presence of a shoe on the conducting segment to which the supply device 20 is associated, and, on the other hand, after analysis of the extracted data, in order to determine if the vehicle 10 is compatible with the supply device, the latter transmits a control signal in order to supply the switching stage 45.

As may be seen in FIG. 3, this switching stage 45 mainly consists of a combination of a pair of elements forming static switches, denoted by the references T1 and T2. It is designed to connect the conducting segment 16 to the high-voltage supply line 24 when a shoe 32 is present and to the current return line 26 when a shoe is not present, respectively.

Preferably, and in order to obtain response times compatible with the speed of movement of the vehicle 10, these elements T1 and T2 consist of insulated-gate bipolar transistors (IGBTs).

The gate, emitter and collector of each of these transistors T1 and T2 are connected to a circuit controlling their switching, 49 and 50 respectively, each connected to the microcontroller 48.

Each of these control circuits 48 and 50 incorporates an amplifier designed to provide the power necessary for controlling the transistors T1 and T2 as well as a passband filter centred on the nominal frequency of the control signal generated by the microcontroller 48, in order to eliminate the signals due to perturbations.

Moreover, the emitter E1 of the transistor T1 is connected to the segment 16D, the collector C1 of this transistor T1 being connected to the supply line 24 via a fuse F.

On the other hand, the collector C2 of the second transistor T2 is connected to the segment 16D, the emitter E2 of this transistor being connected to the line 26 set at the zero potential.

Finally, FIG. 3 shows that the supply device includes a short-circuiting circuit, consisting of a switching element 52 associated with a control member 54 for opening it, this member itself being controlled by the microcontroller 48.

Should there be a fault, the switching element 52 is forced into the closed state by means of a suitable resilient element, that is to say when there is no suitable control signal delivered by the microcontroller to the control member 54, and the segment 16D is set at a zero potential.

Thus, on the one hand, this circuit makes it possible to ensure that all the isolated or defective segments are effectively and permanently connected to the zero-potential line 26.

On the other hand, this circuit is combined with a monitoring logic circuit (not shown) produced from suitable analogue components, which continuously monitors, in an independent manner, the voltage on each segment in order to detect operating defects and which compare this voltage with a permissible maximum value, for example fixed at 30 volts.

The result of this comparison, associated with the absence of the signal from the vehicle, causes the supply to the switching member 52 to be cut off should the fixed threshold value be exceeded.

The presence of the fuse F avoids any risk of a short circuit between the high-voltage supply line and the zero-potential line should the fault detected result in the transistor T1 being short-circuited.

In this case, the fuse F blows, thereby definitively causing the corresponding segment 16D to be set at the zero potential.

The control devices 48 and 50 incorporate means for monitoring the voltage across the terminals of the collector and of the emitter of each transistor so as to interrupt the supply of current to the corresponding segment should a malfunction occur, especially if a current flowing through the transistors has a value greater than a permissible maximum value.

It should be noted that these malfunctions, detected by the microcontroller 48, cause the latter to transmit an alarm signal, transmitted on a specific line 56, to a telesurveillance centre (not shown), this signal preferably being in coded form so as to indicate the location of the defective supply device.

Moreover, it should be noted that the microcontrollers 48 of each supply device are connected via a serial link n−1 and n+1 to the microcontrollers of the immediately adjacent devices. Thus, as soon as one device causes one of the segments of the supply track 16 to be supplied with current, the corresponding microcontroller 48 transmits, to the microcontroller of the devices immediately downstream and upstream, a signal intended to cause the corresponding transistors T1 and T2 to be placed so as to supply the adjacent segments with current, in order to ensure conduction continuity between these adjacent segments.

For example, the presence of a collector shoe on a segment causes three, or even four, adjacent segments to be consecutively energized when the shoe straddles two segments, in order to ensure good current continuity between the segments.

Moreover, it should be noted that the current supplied to the various elements involved in the construction of each supply device 20 is supplied from the high-voltage supply line 24.

Thus, should this supply fail, the short-circuiting circuits remain in the closed state, thereby forcing the corresponding segments to be at the zero potential.

As mentioned previously, the safety level of the supply devices is further increased by virtue of the use of IGBT transistors whose switching times are particularly short, of t he order of a few microseconds, and by the use of a microcontroller suitably capable of switching the transistors sufficiently rapidly for an exposed segment not to be energized or left energized. That is to say, even when the vehicle 10 is running at maximum speed, the segments are set at a zero potential before the end of the train's passage.

Since the segments are set at the zero potential as soon as no signal is detected, little signal processing on the part of the microcontroller is required. This switching therefore takes place at the switching speed of the transistors T1 and T2, that is to say in about one microsecond.

Thus, as soon as a shoe is no longer in contact with a segment and apart from the activation of the adjacent control devices, the latter is more or less instantaneously set to the zero potential and, if this should not occur, the short-circuiting device 52 would come into play before it would be exposed by the vehicle.

On the other hand, supplying this segment with current requires prior processing of the coded signal received from the shoe 32.

However, the speed of the processing carried out by the microcontroller 48, in about ten milliseconds, remains compatible with the switching requirements needed for correctly supplying the vehicle's motor, even at maximum speed.

Moreover, it should be pointed out that, for the sake of safety, the transmitter 42 preferably transmits the signal in the form of a redundant cyclic code, the microcontroller 48 incorporating software means designed to check, based on the processing of this code, that the coded signal in its entirety has been correctly received.

It should be noted that each supply device, and in particular the microcontroller, includes corresponding outputs, on the one hand, with regard to information about a malfunction, allowing the surveillance centre to conduct a diagnostic check via the line 56, and, on the other hand, with regard to information about the location of each segment supplied in order to locate the position of the vehicle.

Since the position of the vehicle is known with an accuracy corresponding to the length of each segment, this safety information may serve for the local remote-controlling of signal or other lights.

It should be understood that the invention that has just been described is not limited to the embodiments envisaged.

In fact, although in the embodiment described with reference to FIG. 3, the vehicle is provided with a single shoe used for conveying the signal transmitted by the transmitter 42 and for transmitting the power to the traction system, it would be possible, as a variant, and as mentioned previously, to provide two separate positive shoes used in an identical and redundant manner in order to get round the problem of the presence of neutral, non-powered areas or for being able to maintain correct operation when breakdowns occur, especially the loss of a shoe.

Moreover, and as mentioned previously, it would also be possible, if the supply system is intended to supply a vehicle fitted with tired wheels, to provide a specific negative shoe in order to ensure the return of the supply current.

In this case, this shoe is preferably longitudinally offset with respect to the shoe for supplying current to a predetermined number of segments, for example three segments, so as to come into contact with a segment set to the return current.

In the latter embodiment, the microcontroller preferably incorporates means for discriminating between the polarity of the supply and current-return shoes, by phase comparison between the signals conveyed by the shoes, so as to prevent the supply device 20 with which the current-return shoe is in communication from supplying the corresponding segment.

Finally, in the embodiment described, the module 46 for receiving the carrier currents constitutes a separate stage from the microcontroller 48.

It would also be possible to integrate it into the microcontroller in the form of a specific algorithm stored in memory, given that the reception of the coded signal always takes place indiscriminately, either by current transfer or by capacitive coupling.

Finally, it should be noted that, in the various embodiments envisaged, the supply system provides a way of detecting faults of a first level, these being due, for example, to a defective actuation of the switching means, a fault in one of the power components or an erroneous supply mode in which only the short-circuiting means are actuated.

As a last resort, the system is put into safety mode by, in combination, the detection of the voltage on the segments and the combination of the short-circuiting means with the fuse which, independently of the microcontroller, set the segment in question to the zero potential.

However, it should be understood that, in this case, the operation of the network may be maintained even when several segments are defective.

What is claimed is:

1. System for supplying current through the ground for an electric vehicle, the system comprising:
    a succession of conducting segments (16A, 16B, 16C, 16D) which are electrically isolated from each other and together form a conducting supply track (16) against which at least one supply collector shoe (32) on the vehicle is applied, the at least one supply collector shoe coming successively into contact with the segments (16A, 16B, 16C, 16D) during the movement of the vehicle; and
    a set of high-voltage supply devices (20) each connected to a corresponding conducting segment of the succession of conducting segments and each comprising:
    means (46, 48) for detecting the at least one supply collector shoe (32); and
    switching means (45) suitable for selectively causing the corresponding conducting segment to be supplied with current when a collector shoe is present on the latter and causing the corresponding conducting segment to be connected to a zero-potential source (26) when a collector shoe is not present thereon,
    the switching means (45) comprising switch-forming elements (T1, T2) forming static switches controlled by the detection means (46, 48) in order to cause the corresponding segment to be supplied with current when the at least one supply collector shoe (32) is present thereon and to be connected to the zero-potential source when the at least one supply collector shoe (32) is not present thereon, respectively, and
    each supply device of the set of high-voltage supply devices (20) comprising short-circuiting means (52, 54) which are forced into the closed state, and are interposed between the corresponding conducting segment and the zero-potential source (26), and which are made to open by the detection means.

2. System according to claim 1, wherein the detection means (46, 48) for detecting when the at least one supply collector shoe is in contact with the corresponding segment comprise means for detecting a coded signal transmitted, by conduction and by carrier current, by the vehicle to the supply device connected to the corresponding segment, via the collector shoe (32).

3. System according to claim 2, wherein the coded signal carries coded information relating to the vehicle (10) which has transmitted the coded signal, the detection means comprise means (48) for processing the said information and means (48) for comparing data resulting from the said processing with data corresponding to information relating to a vehicle permitted to run on the conducting track.

4. System according to any one of claims 2 and 3, wherein the detection means (46, 48) are connected to the high-voltage supply devices in order to position the switch-forming elements (T1, T2) forming static switches of the high-voltage supply devices to supply the corresponding segments with current when the detection means operate the switch-forming elements (T1, T2) to cause the corresponding segment to be supplied with current.

5. System according to any one of claims 1 to 3, wherein the detection means comprise a microprocessor (48) connected to an amplifier and to a passband filter, the output of which causes the power and/or control switching of the switch-forming elements.

6. System according to any one of claims 1 to 3, wherein the high-voltage supply devices are each disposed in a sealed removable module placed in a duct (18) which is made in a roadway along which the vehicle (10) runs and is covered in a sealed manner by the conducting segments (16A, 16B, 16C, 16D), a high-voltage supply line (24) and a line (26) set at a zero potential providing a supply return being disposed longitudinally in the duct.

7. System according to claim 6, wherein the duct (18) is disposed approximately in a central part of an area of the roadway along which the vehicle runs.

8. System according to claim 6, further comprising means for supplying current to the switch-forming element and to the detection means, the means for supplying current comprise the high-voltage supply line.

9. System for supplying current through the ground for an electric vehicle, the system comprising:
    succession of conducting segments (16A, 16B, 16C, 16D) which are electrically isolated from each other and together form a conducting supply track (16) against which at least one supply collector shoe (32) on the vehicle is applied, the at least one supply collector shoe coming successively into contact with the segments (16A, 16B, 16C, 16D) during the movement of the vehicle; and
    a set of high-voltage supply devices (20) each connected to a corresponding conducting segment of the succession of conducting segments and each comprising:
    means (46, 48) for detecting the at least one supply collector shoe (32); and switching means (45) suitable for selectively causing the corresponding conducting segment to be supplied with current when the collector shoe is present on the latter and causing the corresponding conducting segment to be connected to a zero-potential source (26) when the collector shoe is not present thereon, the switching means (45) comprising switch-forming elements (T1, T2) forming static switches controlled by the detection means (46, 48) in order to cause the corresponding segment to be supplied with current when the at least one supply collector shoe (32) is present thereon and to be connected to the zero-potential source when the at least one supply collector shoe (32) is not present thereon, respectively, and each supply device of the set of high-voltage supply devices (20) comprising short-circuiting means (52, 54) which are forced into the closed state, and are interposed between the corresponding conducting segment and the zero-potential source (26), and which are made to open by the detection means, wherein the detection means (46, 48) for detecting when the at least one supply collector shoe is in contact with the corresponding segment comprise means for detecting a coded signal transmitted, by conduction and by carrier current, by the vehicle to the supply device connected to the corresponding segment, via the collector shoe (32), and wherein the detection means comprise means (48) for checking that the coded signal has been received in its entirety, by processing a redundant cyclic code incorporated into the coded signal.

10. System according to claim 9, wherein the detection means (46, 48) are connected to the high-voltage supply devices in order to position the switch-forming elements (T1, T2) forming static switches of the high-voltage supply devices to supply the corresponding segments with current when the detection means operate the switch-forming elements (T1, T2) to cause the corresponding segment to be supplied with current.

11. System according to claim 9, wherein the detection means comprise a microprocessor (48) connected to an amplifier and to a passband filter, the output of which causes the power and/or control switching of the switch-forming elements.

12. System according to claim 9, wherein the high-voltage supply devices are each disposed in a sealed removable module placed in a duct (18) which is made in a roadway along which the vehicle (10) runs and is covered in a sealed manner by the conducting segments (16A, 16B, 16C, 16D), a high-voltage supply line (24) and a line (26) set at a zero potential providing a supply return being disposed longitudinally in the duct.

13. System according to claim 12, wherein the duct (18) is disposed approximately in a central part of an area of the roadway along which the vehicle runs.

14. System according to claim 12, further comprising means for supplying current to the switch-forming element and to the detection means, the means for supplying current comprise the high-voltage supply line.

15. System for supplying current through the ground for an electric vehicle, the system comprising:

a succession of conducting segments (16A, 16B, 16C, 16D) which are electrically isolated from each other and together form a conducting supply track (16) against which at least one supply collector shoe (32) on the vehicle is applied, the at least one supply collector shoe coming successively into contact with the segments (16A, 16B, 16C, 16D) during the movement of the vehicle; and a set of high-voltage supply devices (20) each connected to a corresponding conducting segment of the succession of conducting segments and each comprising:

means (46, 48) for detecting the at least one supply collector shoe (32); and switching means (45) suitable for selectively causing the corresponding conducting segment to be supplied with current when the collector shoe is present on the latter and causing the corresponding conducting segment to be connected to a zero-potential source (26) when the collector shoe is not present thereon, the switching means (45) comprising switch-forming elements (T1, T2) forming static switches controlled by the detection means (46, 48) in order to cause the corresponding segment to be supplied with current when the at least one supply collector shoe (32) is present thereon and to be connected to the zero-potential source when the at least one supply collector shoe (32) is not present thereon, respectively, and each supply device of the set of high-voltage supply devices (20) comprising short-circuiting means (52, 54) which are forced into the closed state, and are interposed between the corresponding conducting segment and the zero-potential source (26), and which are made to open by the detection means, wherein the detection means (46, 48) for detecting when the at least one supply collector shoe is in contact with the corresponding segment comprise means for detecting a coded signal transmitted, by conduction and by carrier current, by the vehicle to the supply device connected to the corresponding segment, via the collector shoe (32), and wherein the coded signal carries coded information relating to the vehicle (10) which has transmitted the coded signal, the detection means comprise means (48) for processing the said information and means (48) for comparing data resulting from the said processing with data corresponding to information relating to the vehicle permitted to run on the conducting track, said system further comprising a monitoring device for monitoring the voltage on each segment of the conducting segments (16A, 1GB, 16C, 16D) connected to each of the detection means, the monitoring device comprising means for comparing the voltage on the corresponding segment with a maximum threshold value, and a set of logic circuits designed to cause the short-circuiting means to close if the threshold value is exceeded and a collector shoe is not present.

16. System according to claim 15, wherein the monitoring device constitutes an element independent of the processing means (48).

17. System according to claim 15, wherein said each supply device comprises a fuse (F) placed in series on the switch-forming element (T1) that controls the supply of current to the corresponding segment.

18. System for supplying current through the ground for an electric vehicle, the system comprising:

a succession of conducting segments (16A, 16B, 16C, 16D) which are electrically isolated from each other and together form a conducting supply track (16) against which at least one supply collector shoe (32) on the vehicle is applied, the at least one supply collector shoe coming successively into contact with the segments (16A, 16B, 16C, 16D) during the movement of the vehicle; and a set of high-voltage supply devices (20) each connected to a corresponding conducting segment of the succession of conducting segments and each comprising:

means (46, 48) for detecting the at least one supply collector shoe (32); and switching means (45) suitable for selectively causing the corresponding conducting segment to be supplied with current when the collector shoe is present on the latter and causing the corresponding conducting segment to be connected to a zero-potential source (26) when the collector shoe is not present thereon, the switching means (45) comprising switch-forming elements (T1, T2) forming static switches controlled by the detection means (46, 48) in order to cause the corresponding segment to be supplied with current when the at least one supply collector shoe (32) is present thereon and to be connected to the zero-potential source when the at least one supply collector shoe (32) is not present thereon, respectively, and each supply device of the set of high-voltage supply devices (20) comprising short-circuiting means (52, 54) which are forced into the closed state, and are interposed between the corresponding conducting segment and the zero-potential source (26), and which are made to open by the detection means, wherein the switch-forming elements (T1, T2) comprise insulated-gate bipolar transistors (IGBTs).

19. System according to claim 18, wherein said each high-voltage supply device comprises means (49, 50) for monitoring voltage across terminals of the IGBT transistors for the purpose of preventing the corresponding segment from being supplied with current when a malfunction is present, or when a current flowing through the transistors has a value greater than a permissible maximum value.

20. System according to claim 18, further comprising a second collector shoe providing a return for the supply current, wherein the detection means (44) further comprises means for discriminating between the polarity of the at least one supply collector shoe and the collector second shoe.

21. System for supplying current through the ground for an electric vehicle, the system comprising:

a succession of conducting segments (16A, 16B, 16C, 16D) which are electrically isolated from each other and together form a conducting supply track (16) against which at least one supply collector shoe (32) on the vehicle is applied, the at least one supply collector shoe coming successively into contact with the segments (16A, 16B, 16C, 16D) during the movement of the vehicle; and a set of high-voltage supply devices (20) each connected to a corresponding conducting segment of the succession of conducting segments and each comprising:

means (46, 48) for detecting the at least one supply collector shoe (32); and switching means (45) suitable for selectively causing the corresponding conducting segment to be supplied with current when the collector shoe is present on the latter and causing the corresponding conducting segment to be connected to a zero-potential source (26) when the collector shoe is not present thereon, the switching means (45) comprising switch-forming elements (T1, T2) forming static switches controlled by the detection means (46, 48) in order to cause the corresponding segment to be supplied with current when the at least one supply collector shoe (32) is present thereon and to be connected to the zero-potential source when the at least one supply collector shoe (32) is not present thereon, respectively, and each supply device of the set of high-voltage supply devices (20) comprising short-circuiting means (52, 54) which are forced into the closed state, and are interposed between the corresponding conducting segment and the zero-potential source (26), and which are made to open by the detection means, wherein outputs of the high-voltage supply devices constitute a means for locating the vehicle, intended to locally operate signaling devices, and/or a means for detecting malfunctions for carrying out a diagnostic check.

22. An electric vehicle (10) supplied by a system for supplying current through the ground, the system including:

a succession of conducting segments (16A, 16B, 16C, 16D) which are electrically isolated from each other and together form a conducting supply track, and a set of high-voltage supply devices (20) each connected to a corresponding conducting segment of the succession of conducting segments and each including:

means (46, 48) for detecting a supply collector shoe, and switching means (45) suitable for selectively causing the corresponding conducting segment to be supplied with current when the supply collector shoe is present on the latter and causing the corresponding conducting segment to be connected to a zero-potential source (26) when the collector shoe is not present thereon, the switching means (45) comprising switch-forming elements (T1, T2) forming static switches controlled by the detection means (46, 48) in order to cause the corresponding segment to be supplied with current when the supply collector shoe is present thereon and to be connected to the zero-potential source when the supply collector shoe is not present thereon, respectively, and each supply device of the set of high-voltage supply devices (20) comprising short-circuiting means (52, 54) which are forced into the closed state, and are interposed between the corresponding conducting segment and the zero-potential source (26), and which are made to open by the detection means, the electric vehicle comprising:

at least one shoe (32) for supplying current to a motor of the vehicle, wherein the at least one shoe is applied against the conducting track of the system for supplying current through the ground, and the at least one shoe has means (42) for transmitting a coded signal conveying information relating to a type of the electric vehicle (10).

23. Vehicle according to claim 22, further comprising at least one second shoe providing the return of the supply current, the second shoe being longitudinally offset with respect to the at least one shoe for supplying current by a predetermined number of the conducting segments.

24. Vehicle according to claim 22, wherein said vehicle (10) is an electric rail vehicle, and a return of the supply current is provided by running rails (14) along which the rail vehicle runs.

25. Vehicle according to claim 22, wherein said vehicle (10) is a guided electric road vehicle, and a return of the supply current is provided by a guide rail.

26. Vehicle according to any one of claims 22 to 25, further comprising means (36) for switching the supply mode.

27. Vehicle according to any one of claim 22 to 25, comprising means (43) for recovering electrical energy.

28. System for supplying current through the ground for an electric vehicle, the system comprising:

- a succession of conducting segments (16A, 16B, 16C, 16D) which are electrically isolated from each other and together form a conducting supply track (16) against which at least one supply collector shoe (32) on the vehicle is applied, the at least one supply collector shoe coming successively into contact with the segments (16A, 16B, 16C, 16D) during the movement of the vehicle; and
- a set of high-voltage supply devices (20) each connected to a corresponding conducting segment of the succession of conducting segments and each comprising:
    - means (46, 48) for detecting the at least one supply collector shoe (32); and
    - switching means (45) suitable for selectively causing the corresponding conducting segment to be supplied with current when the collector shoe is present on the latter and causing the corresponding conducting segment to be connected to a zero-potential source (26) when the collector shoe is not present thereon,
    - the switching means (45) comprising switch-forming elements (T1, T2) forming static switches controlled by the detection means (46, 48) in order to cause the corresponding segment to be supplied with current when the at least one supply collector shoe (32) is present thereon and to be connected to the zero-potential source when the at least one supply collector shoe (32) is not present thereon, respectively, and
- each supply device of the set of high-voltage supply devices (20) comprising short-circuiting means (52, 54) which are forced into the closed state, and are interposed between the corresponding conducting segment and the zero-potential source (26), and which are made to open by the detection means,
- wherein the detection means (46, 48) for detecting when the at least one supply collector shoe is in contact with the corresponding segment comprise means for detecting a coded signal transmitted, by conduction and by carrier current, by the vehicle to the supply device connected to the corresponding segment, via the collector shoe (32),
- wherein the coded signal carries coded information relating to the vehicle (10) which has transmitted the coded signal, the detection means comprise means (48) for processing the said information and means (48) for comparing data resulting from the said processing with data corresponding to information relating to the vehicle permitted to run on the conducting track, and
- wherein the detection means comprise means (48) for checking that the coded signal has been received in its entirely, by processing a redundant cyclic code incorporated into the coded signal.

* * * * *